United States Patent
Brunel (10) Patent No.: US 7,277,469 B2
(45) Date of Patent: Oct. 2, 2007

(54) METHOD FOR CONJOINT CHANNEL AND DIRECTION OF ARRIVAL ESTIMATION

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1099 days.

(21) Appl. No.: 09/919,917

(22) Filed: Aug. 2, 2001

(65) Prior Publication Data
US 2002/0048286 A1    Apr. 25, 2002

(30) Foreign Application Priority Data
Aug. 29, 2000  (FR) ................................ 00 11160

(51) Int. Cl.
*H04B 1/00* (2006.01)
(52) U.S. Cl. .................................. 375/147
(58) Field of Classification Search ............... 375/226, 375/227, 340, 346, 347, 349, 224, 316, 147; 324/76.11–76.13, 76.25, 76.18–76.19, 77.11, 324/76.33, 0.77; 342/147, 157, 159, 165, 342/350, 417, 385; 455/39, 67.13–67.14, 455/67.11
See application file for complete search history.

(56) References Cited
U.S. PATENT DOCUMENTS
4,714,802 A  * 12/1987  Stein .............................. 178/1
5,400,036 A  *  3/1995  Kochiyama et al. ........ 342/370
6,356,510 B1 *  3/2002  Wagstaff et al. ............ 367/135

OTHER PUBLICATIONS

M. C. Vanderveen, et al., IEEE Communications Letters, vol. 1, XP-000643014, pp. 12-14, "Joint Angle and Delay Estimation (Jade) for Multipath Signals Arriving at an Antenna Array", Jan. 1997.
C-S. Shieh, et al., IEEE Transactions on Antennas and Propagation, vol. 48, No. 7, XP-002167981, pp. 1115-1124, "Direction of Arrival Estimation Based on Phase Differences Using Neural Fuzzy Network", Jul. 1, 2000.

* cited by examiner

*Primary Examiner*—Pankaj Kumar
(74) *Attorney, Agent, or Firm*—Oblon, Spivak, McClelland, Maier & Neustadt, P.C.

(57) ABSTRACT

Method of estimating the channel and the direction of arrival of a signal transmitted by a transmitter and received by an array of antennae after being propagated along at least one path, comprising, for each path, a first step of estimating phase differences ($\xi_l$) in the signals received by the different antennae in the array, a second step of estimating the angle of arrival ($\theta$) of the signal as well as the phase rotation ($\nu$) undergone by the signal along the said path from the said phase differences and a third step of estimating the attenuation ($\alpha$) undergone by the signal along the said path from the estimated values ($\hat{\nu}, \hat{\theta}$) of the phase rotation and the angle of arrival.

16 Claims, 3 Drawing Sheets

METHOD FOR CONJOINT CHANNEL AND DIRECTION OF ARRIVAL ESTIMATION

BACKGROUND OF THE INVENTION

1. Field of the Invention

The present invention concerns in general terms a method of determining the spatial transfer function of a transmission channel by means of an array of antennae. More precisely, when the propagation of the signal between a transmitter and an array of reception of antennae takes place along a plurality of paths, the present invention makes it possible to estimate, for each path, the direction of arrival conjointly with the attenuation and phase rotation undergone by the signal along this path. The present invention applies more particularly to the estimation of the channel and the direction of arrival in mobile telephony.

2. Description of Related Art

The propagation of a signal between a transmitter and receiver, in particular between a mobile telephone and a base station, can take place along multiple paths. Each path is characterised by a delay, a direction of arrival, an attenuation and a phase rotation.

It is known that an array of antennae can be used to form a beam and/or cancel interference in one or more directions. The antenna processing consists of a weighting of the outputs of the different antennae with complex coefficients before summing, the coefficients being chosen so as to obtain the equivalent antenna diagram required. It is thus possible to form a beam in the direction of arrival of the useful signal whilst placing zeros in the directions of arrival of the interfering signals. The majoring of the beam formation techniques however require prior knowledge of the direction of arrival of the signal. Beam formation has been applied to mobile telephony, notably to direct a reception beam from a base station to a mobile station (uplink). The base station is then equipped with an adaptive antennae (referred to as an "intelligent antenna") capable of pointing in the direction of a propagation path issuing from a mobile terminal.

In addition to the direction of arrival of the useful signal, it is often necessary to know the characteristics of the transmission channel. Thus, when a mobile telephony system is functioning according to a code division multiple access (CDMA) mode and is exploiting diversity in reception by virtue of a rake receiver, the complex coefficient used in the different branches of the receiver are obtained from the attenuation and phase rotation undergone along the different paths.

It is known that an adaptive antenna can be used, exploiting the diversity of paths. For this purpose, the systems of the state of the art use one rake receiver per antenna and effect the beam formation from signals issuing from the different receivers. It can also be envisaged pointing several beams in the directions of arrival of the different paths and then combining the different paths in a rake receiver. In both cases the direction of arrival of the useful signal and the characteristics of the transmission channel are estimated independently. This approach has the double drawback of requiring two estimation steps and not using all the information available at the second estimation step.

SUMMARY OF THE INVENTION

The aim of the present invention is to remedy the aforementioned drawbacks and to propose a conjoint method of estimating the direction of arrival and the characteristics of the transmission channel. More particularly, when the transmission channel has several propagation paths, the invention makes it possible to estimate the direction of arrival of each path and the complex coefficient (attenuation and phase rotation) characterising each path.

BRIEF SUMMARY OF THE INVENTION

The invention is defined by a method of estimating the channel and the direction of arrival of a signal transmitted by a transmitter and received by an array of antennae after being propagated along at least one path, the method comprising, for each path, a first step of estimating phase differences ($\xi_l$) in the signals received by the different antennae in the array, a second step of estimating the angle of arrival ($\theta$) of the signal as well as the phase rotation ($v$) undergone by the signal along the said path from the said phase differences and a third step of estimating the attenuation ($\alpha$) undergone by the signal along the said path from the estimated values ($\hat{v}$, $\hat{\theta}$) of the phase rotation and the angle of arrival.

Advantageously, the first step comprises, for each signal received ($x_l$), the minimisation of a first distance between a plurality of values of the said signal ($x_l(t)$) taken at a plurality of times (t) and the values taken at the same times of a pilot signal (b(t)) which underwent the phase shift and the attenuation to be estimated.

According to one characteristic of the invention, the second step comprises a removal of ambiguity of the phase differences, the removal of ambiguity operating step by step from one antenna to the next starting from a reference antenna for the array.

Advantageously, the removal of ambiguity uses an affine relationship between the phase differences and the rank of the antenna in the array.

According to another characteristic of the invention, the phase rotation ($v$) and the angle of arrival ($\theta$) are estimated from a linear regression on the estimated values of the phase differences.

Advantageously, the phase rotation ($v$) and the angle of arrival ($\theta$) are estimated by minimising a second distance $$J(v, \varphi) = \sum_{l=1}^{L} \left(v + (l-1) \cdot \varphi - \hat{\xi}_l\right)^2$$

where $\hat{\xi}_l$ is the estimated value of the phase shift of the signal received by the antenna of rank l, $\varphi = 2\pi \cdot \cos(\theta) \cdot d/\lambda$ where d is the pitch of the array, $\lambda$ the wavelength of the signal and L the number of antennae in the array.

According to another characteristic of the invention, a new estimation ($\tilde{\hat{\xi}}_l$) of the phase differences is carried out using the estimated value of the phase rotation ($\hat{v}$) and that of the angle of arrival ($\hat{\theta}$).

Advantageously, the attenuation ($\alpha$) is estimated by minimising a third distance between a plurality of values of the said signal ($x_l(t)$) taken at a plurality of times (t) and the values taken at the same times of a shifted pilot signal (b(t)) of the phase shift values ($\tilde{\hat{\xi}}_l$) newly estimated and which have undergone the attenuation ($\alpha$) to be estimated, the distance being calculated on all the antennae in the array.

The invention is also defined by a signal reception device comprising an array of antennae and estimation means adapted to implement the steps of the estimation method disclosed above.

According to one characteristic of the invention, the device comprises, at the output of each antenna, a plurality of filters adapted to the different signal propagation paths and a plurality of estimation means, each estimation means being associated with a path (i) and receiving the outputs of the filters adapted to the corresponding path.

According to another characteristic of the invention, the device comprises channel formation means, each channel formation means being associated with a path (i) and receiving, from the estimation means associated with the said path, the estimation $\hat{\theta}_i$ of the angle of arrival of the said path in order to form a channel in the corresponding direction.

In addition, each channel formation means can also receive estimation means other than the associated estimation means, the estimations ($\hat{\theta}_{i'}$, i'≠i) of the angles of arrival of the other paths in order to place zeros in the corresponding directions.

Advantageously, the device comprises a plurality of complex multiplication means, each complex multiplication means being associated with a path (i) and multiplying the output of a channel formation means by a complex coefficient $\hat{\alpha}_i \cdot e^{-j\hat{v}_i}$ where $\hat{v}_i$ and $\hat{\alpha}_i$ are the estimated values of the coefficient of attenuation supplied by the estimation means associated with the said path.

LIST OF FIGURES

The characteristics of the invention mentioned above, as well as others, will emerge more clearly from a reading of the description given in relation to the accompanying figures, amongst which.

BRIEF DESCRIPTION OF THE DRAWINGS

DETAILED DESCRIPTION

Figure 1:
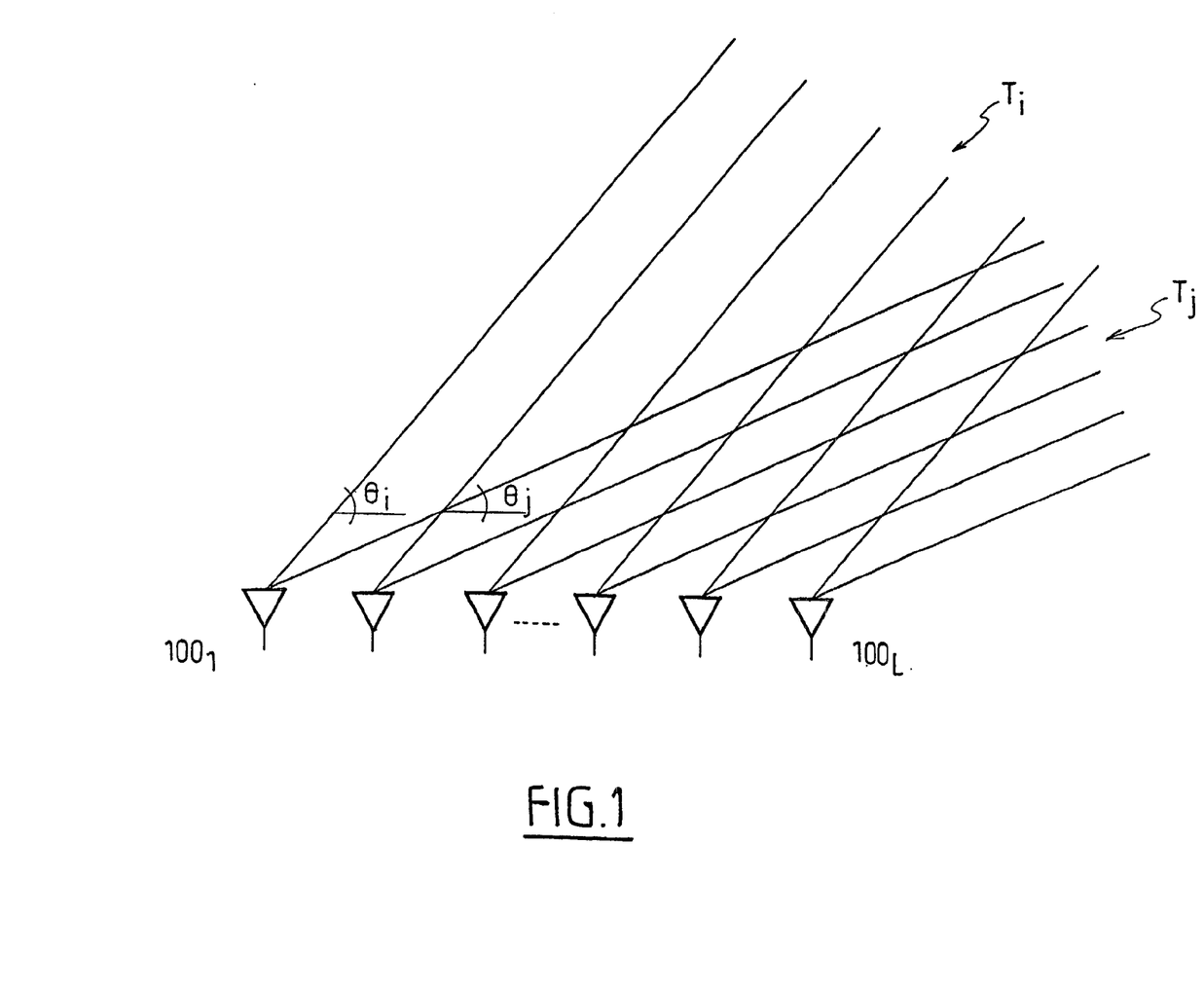
FIG. 1 depicts schematically a multipath propagation between-a source and an array of antennae.

It is assumed, as illustrated in FIG. 1, that a signal is transmitted by a source and received by an array of antennae. The array illustrated is uniform and linear but, naturally, other embodiments can be envisaged, notably sectorial arrays having elementary antennae arranged in an arc of a circle. The signal propagates according to a plurality p of paths, each path i=1 . . . p arriving at the array at an angle of incidence $\theta_i$. The set of paths constitutes the transmission channel between the transmitting source and the receiving array. If several sources j=1 . . . J each transmit a signal $S_j$, there will be J distinct transmission channels, each channel consisting of a plurality of paths.

In the context of a mobile telecommunication system, the transmission channels in question will correspond to uplinks between mobile terminals, hereinafter referred to as users, and the base station. When several uplinks are simultaneously established with the same base station, a given transmission channel may be disturbed by the signals from the other users (multi-user interference). In addition, the signal of a given user being propagated on different paths arrives at the array after different propagation times. The transmission channels generally being dispersive in time because of their frequency selectivity, their pulse responses have a not insignificant duration, which creates interference between the signals which have come from the same user but have followed distinct paths (multi-path interference). In certain systems, notably those using direct sequence CDMA (DS-CDMA) access, each path of each user comes to be isolated to a certain extent. To do this, the good properties of autocorrelation and intercorrelation of the spreading sequences (spreading codes) are exploited by filtering the signal received by a bank of suitable filters. The multi-user and multi-path interferences are however not completely eliminated and residual interference remains. If the users are sufficiently numerous, the limit central theorem can be applied and the residual interference seen an additive white Gaussian noise.

The invention presupposes that the receiver can, at least roughly, separate, at each antenna, the different paths of a signal issuing from a user. This will be the case for a DS-CDMA system, if a battery of filters adapted to these different paths is used at the output of each antenna. This will still be the case if the transmission channel between the user and receiver consists essentially of a single path.

Each path i, i=1 . . . p is in reality the combination of a large number of elementary paths which have undergone reflections and diffusions produced by the environment of the receiver and transmitter. With each of these elementary paths there are associated a phase rotation and an attenuation which follow uniform laws. According to the limit central theorem, the signal $s_i(t)$ coming from the path i can then be written:

$$s_i(t) = \alpha_i(t) \cdot e^{jv_i(t)} \cdot b_i(t) + n_i(t) \tag{1}$$

where $\alpha_i(t)$ is the attenuation associated with the path i obeying a Rayleigh law, $v_i(t)$ is the phase rotation, uniformly distributed on ]-π;π], $b_i(t)$ is the information sent and $n_i(t)$ is an additive white Gaussian noise including the residual interference. The channel is variant over time. One of the parameters making it possible to quantify this variation is the coherence time $(\Delta t)_c$, which guarantees that two responses of the channel at two times separated by more than $(\Delta t)_c$ are non-correlated. If the antennae employed in the array are not omni-directional, the coefficient $\alpha_i(t)$ also includes the antenna gain.

The transmission channel between a user and the receiver will now be considered. It will be assumed that the receiver can isolate a path i of the channel, either because the channel includes only one path, or because a filtering adapted to the path i is used. A single path being considered, it is possible to omit the index i in order to simplify the notations. It will also be assumed that the signal arrives at a uniform linear array of L antennae at an angle of incidence $\theta(t)$.

Denoting as $x_l$ the signal received at the antenna l, l= (1, . . . , L), it is possible to write:

$$x_l(t) = \alpha(t) \cdot e^{j\xi_l(t)} \cdot b(t) + n_l(t) \tag{2}$$

with $$\xi_l(t) = v(t) + (l-1) \cdot \varphi(t) = v(t) + 2\pi \frac{d}{\lambda}(l-1)\cos(\theta(t)) \tag{3}$$

where d is the pitch of the network λ is the wavelength, b(t) is the symbol sent by the user, $n_l(t)$ is the additive white Gaussian noise at the antenna l including the thermal noise, the multi-path interference and the multi-user interference.

The response of the channel is thus modelled by an attenuation coefficient α(t) and a phase rotation v(t). The total phase shift $\xi_l(t)$ results on the one hand from the phase rotation $v(t)$ caused by the channel and on the other hand from the difference in operation between the antenna 1 and the reference antenna 1 at the angle of arrival $\theta(t)$.

The invention proposes a conjoint estimation of $v(t)$, $\theta(t)$, $\alpha(t)$ from the signals $x_l(t)$ and a priori information on the transmitted symbol $b(t)$. The symbol $b(t)$ can be a pilot symbol perfectly known to the receiver or a symbol issuing from a decoding operation prior to soft or hard decisions and having a sufficient degree of reliability.

$v(t)$, $\theta(t)$, $\alpha(t)$ will be assumed constant over an observation window of length T chosen so as to be small compared with the coherence time $(\Delta t)_c$. The length T will be chosen so that, the higher the speed of the mobile, the shorter the length, and chosen so that, the lower the signal to noise ratio, the longer the length. It can change over time according to the transmission conditions.

$\theta$, $\alpha$ and $v$ are sought such that the quadratic distance D is at a minimum.

$$D = \sum_{t=1}^{T} \sum_{l=1}^{L} |x_l(t) - \alpha \cdot e^{j\xi_l} \cdot b(t)|^2 \quad (4)$$

The resolution of such a problem requires the resolution of a complex non-linear system. The problem is resolved by dividing it into three steps.

Step 1: $\xi_l$ is estimated by minimising the quadratic distance $D_l$ at each antenna:

$$D_l = \sum_{t=1}^{T} |x_l(t) - \alpha \cdot e^{j\xi_l} \cdot b(t)|^2 \quad (5)$$

Step 2: $\theta$ and $v$ are estimated from a linear regression on the estimated values $\hat{\xi}_l$.

Step 3: from the estimated values $\hat{v}$ and $\hat{\theta}$, $\alpha$ is estimated finally by minimising the quadratic distance $$D = \sum_{l=1}^{L} D_l.$$

In a first step it is sought to estimate the phase shift of the signal at each antenna, that is to say the value $\hat{\xi}_l$ of $\xi_l$ which minimises $D_l$:

$$D_l = \sum_{t=1}^{T} |x_l(t) - \alpha \cdot e^{j\xi_l} \cdot b(t)|^2 \quad (6)$$

$$= \sum_{t=1}^{T} (x_l(t) - \alpha \cdot e^{j\xi_l} \cdot b(t)) \cdot (x_l^*(t) - \alpha \cdot e^{-j\xi_l} \cdot b^*(t))$$

$$= \sum_{t=1}^{T} (|x_l(t)|^2 + \alpha^2 \cdot |b(t)|^2 - 2 \cdot \mathrm{Re}(x_l(t) \cdot \alpha \cdot e^{-j\xi_l} \cdot b^*(t)))$$

If the real part of equation (6) is taken, there is obtained:

$$x_l(t) \cdot \alpha \cdot e^{-j\xi_l} \cdot b^*(t) = \alpha \cdot (x_l^R(t) + j \cdot x_l^I(t)) \cdot (b^R(t) - j \cdot b^I(t)) \cdot \quad (7)$$

-continued $(\cos(\xi_l) - j \cdot \sin(\xi_l))$ $$= \alpha \cdot ([x_l^R(t) \cdot b^R(t) + x_l^I(t) \cdot b^I(t)] +$$

$$j \cdot [x_l^I(t) \cdot b^R(t) - x_l^R(t) \cdot b^I(t)]) \cdot$$

$(\cos(\xi_l) - j \cdot \sin(\xi_l))$ and therefore $$\mathrm{Re}(x_l(t) \cdot \alpha \cdot e^{-j\xi_l} b^*(t)) = \alpha([x_l^R(t) \cdot b^R(t) + x_l^I(t) \cdot b^I(t)] \cdot \cos(\xi_l) + \quad (8)$$

$$[x_l^I(t) \cdot b^R(t) - x_l^R(t) \cdot b^I(t)] \cdot \sin(\xi_l))$$

By using equations (6) and (8) it is possible to calculate the derivative of the distance $D_l$ according to $\xi_l$. There is obtained:

$$\frac{\partial D_l}{\partial \xi_l} = -2 \cdot \sum_{t=1}^{T} \frac{\partial [\mathrm{Re}(x_l(t) \cdot \alpha \cdot e^{-j\xi_l} \cdot b^*(t))]}{\partial \xi_l} \quad (9)$$

$$= -2\alpha \cdot \sum_{t=1}^{T} (-[x_l^R(t) \cdot b^R(t) + x_l^I(t) \cdot b^I(t)] \cdot \sin(\xi_l) +$$

$$[x_l^I(t) \cdot b^R(t) - x_l^R(t) \cdot b^I(t)] \cdot \cos(\xi_l))$$

The value $\hat{\xi}_l$ of $\xi_l$ is sought which cancels out the derivative of equation (9). $\hat{\xi}_l$ must therefore satisfy the following equation:

$$\sum_{t=1}^{T} [x_l^I(t) \cdot b^R(t) - x_l^R(t) \cdot b^I(t)] \cdot \cos(\hat{\xi}_l) = \quad (10)$$

$$\sum_{t=1}^{T} [x_l^R(t) \cdot b^R(t) + x_l^I(t) \cdot b^I(t)] \cdot \sin(\xi_l)$$

In order to simplify the writings, let the following sums be defined:

$$S_l^1 \triangleq \sum_{t=1}^{T} x_l^I(t) \cdot b^R(t)$$

$$S_l^2 \triangleq \sum_{t=1}^{T} x_l^R(t) \cdot b^I(t)$$

$$S_l^3 \triangleq \sum_{t=1}^{T} x_l^R(t) \cdot b^R(t)$$

$$S_l^4 \triangleq \sum_{t=1}^{T} x_l^I(t) \cdot b^I(t)$$

By replacing the above sums in equation (10), the estimated value of the phase shift $\xi_l$ is obtained:

$$\hat{\xi}_l \text{Arc} \tan\left(\frac{S_l^1 - S_l^2}{S_l^3 + S_l^4}\right) \quad (11)$$

In the second step, $\theta$ and $v$ are estimated from the estimated values $\hat{\xi}_l$ of the phase shifts $\xi_l$. The calculation of the estimated values $\hat{\theta}$ and $\hat{v}$ will be made in the simple case of a uniform linear array but can extend to any array.

On the first antenna (l=1) taken as the reference antenna, the phase rotation does not depend on the direction of arrival: $\xi_l = v$. It is therefore possible to provisionally choose $\hat{v}$ equal to $\xi_1$. Equation (10) nevertheless has two distinct solutions on $(-\pi, \pi)$, which correspond to a maximum and minimum of the function $D_l(\xi_l)$ and different by an angle $\pi$. These two estimated values are:

$$\hat{\xi}_1^0 \in \left[-\frac{\pi}{2}; \frac{\pi}{2}\right] \text{ and } \hat{\xi}_1^1 = \hat{\xi}_1^0 + \pi$$

The minimum corresponds to the value for which the second derivative $$\frac{\partial^2 D_l}{\partial \xi_l^2}$$

with l=1 is positive.

$$\frac{\partial^2 D_l}{\partial \xi_l^2} = 2\alpha \cdot [(S_l^3 + S_l^4) \cdot \cos(\xi_l) + (S_l^1 - S_l^2) \cdot \sin(\xi_l)] \quad (13)$$

$\hat{\xi}_l$ is that of the two values supplied by equation (10) which corresponds to a positive value of formula (13) for l=1. Consider now the other antennae (l>1). The value of $\xi_l$ is related to $\theta$ and $v$ by the following equalities:

$$\xi_l = v + \varphi_l = v + (l-1) \cdot \varphi = v + 2\pi \frac{d}{\lambda}(l-1)\cos\theta \quad (14)$$

Equation (10) has several solutions. Let $\hat{\xi}_l^o$ be the unique solution such that $$\hat{\xi}_l^0 \in \left[-\frac{\pi}{2}; \frac{\pi}{2}\right].$$

The other solutions are $\hat{\xi}_l^k = \hat{\xi}_l^o + k.\pi$ with k a relative integer.

According to equation (14) there must always be $$\hat{\xi}_l^k \in \left[-2\pi\frac{d}{\lambda}(l-1) + v; 2\pi\frac{d}{\lambda}(l-1) + v\right]. \quad (15)$$

It must therefore always be necessary to seek all the possible solutions which satisfy conditions (14) and (15) replacing $v$ by its estimated value already available $\hat{\xi}_l$. If $d/\lambda = \frac{1}{2}$, the length of the segment of equation (15) is $2(l-1)\pi$. There therefore exists at most $2(l-1)$ possible values of $\hat{\xi}_l^k$ for $d/\lambda \leq \frac{1}{2}$. It is then necessary to verify, for each of these solutions, if it is indeed a minimum and therefore if the second derivative supplied by formula (13) is indeed positive for the value $\xi_l = \hat{\xi}_l^k$. By virtue of the properties of periodicity of the cosine and sine functions, it can be shown that, if $\hat{\xi}_{lo}$ is a minimum, all the $\hat{\xi}_l^k$ values with k even are minima and all the $\hat{\xi}_l^k$ values with k odd are maxima. Likewise, if $\hat{\xi}_l^o$ is a maximum, all the $\hat{\xi}_l^k$ with k even are maxima and all the $\hat{\xi}_l^k$ values with k odd are minima. It is therefore deduced from this that, amongst the $2(l-1)$ possible values of $\hat{\xi}_l^k$, only $(l-1)$ values are minima.

Figure 2:
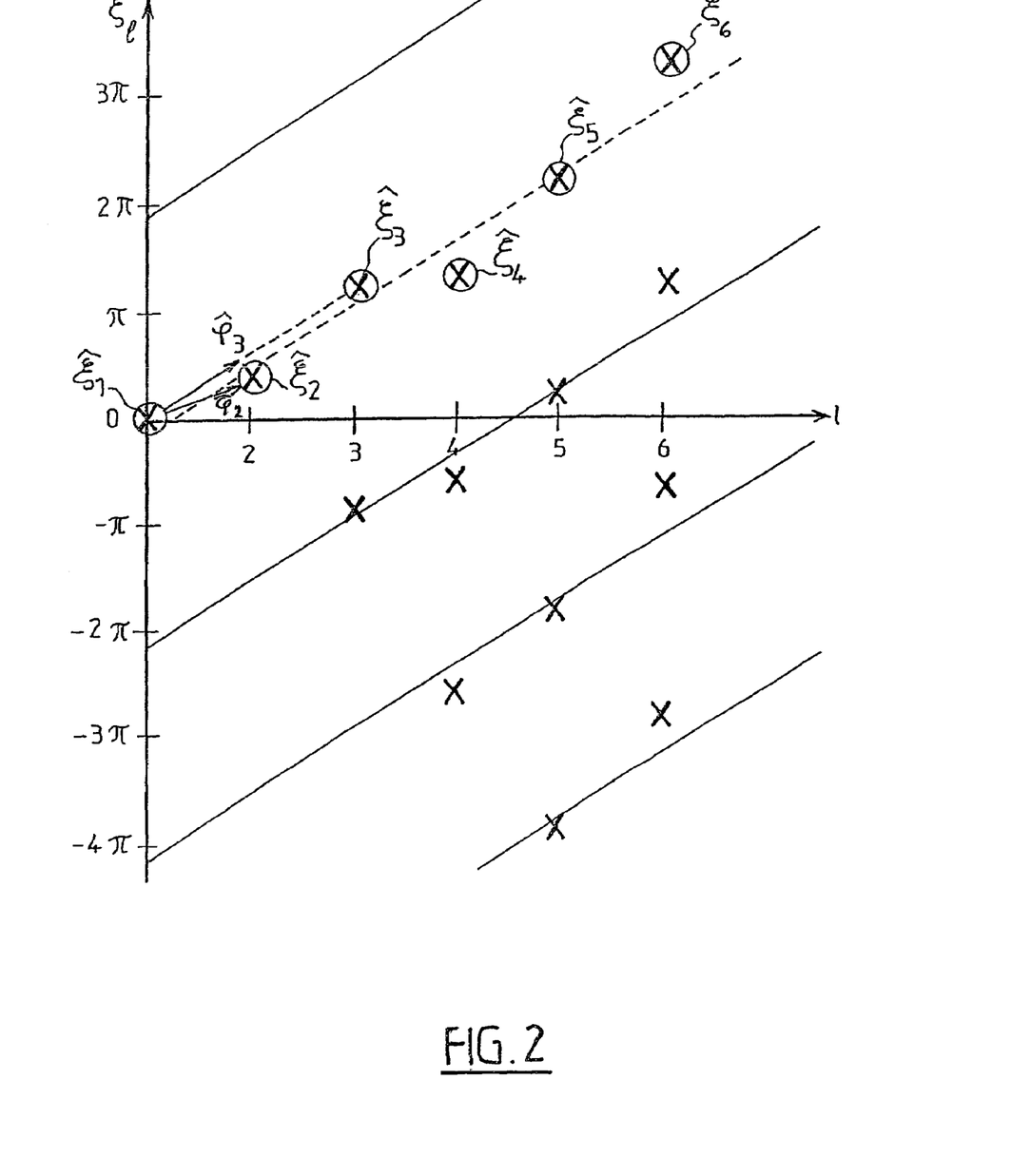
FIG. 2 depicts a diagram illustrating an ambiguity removal procedure useful to one embodiment of the invention.

It therefore remains to choose one minimum amongst the different minima obtained. The ambiguity removal procedure is illustrated in FIG. 2. For (l=2) and $d/\lambda \leq \frac{1}{2}$, which is always the case in practice, $\hat{\xi}_2^k \in [-\pi+v; \pi+v]$ and there therefore exists only one minimum $\hat{\xi}_2$. This minimum makes it possible to make a first estimation $\hat{\phi}^{(2)}$ of $\phi$: $\hat{\phi}^{(2)} = \hat{\xi}_2 - \hat{\xi}_1$. The ambiguity on the estimated values $\hat{\xi}_l^k$ increases linearly with the rank l of the antenna. However, the affine relationship between $\xi_l$ and $\phi$ and a condition of continuity of $\phi$ from one antenna to the following make it possible to remove this ambiguity. More precisely, for l>2, amongst all the possible minima the one is chosen which leads to the smallest variation in the estimation of $\phi$ from the antenna l-1 to the antenna l, that is to say:

$$\hat{\xi}_l = \hat{\xi}_l^{\hat{k}} \text{ with } \hat{k} = \underset{k \text{ such that } \hat{\xi}_l^k \text{ is a minimum}}{\arg\min} (|\hat{\varphi}(k,l) - \hat{\varphi}(l-1)|) \quad (16)$$

$$\text{where } \hat{\varphi}^{(k,l)} = \frac{\hat{\xi}_l^k - \hat{v}}{l-1}$$

$$\text{and } \hat{\varphi}^{(l)} = \frac{\hat{\xi}_l - \hat{v}}{l-1}$$

where the choice of $\hat{\xi}_l$ expressed by equation (16) represents the continuity of $\phi$ from one antenna to the next. The ambiguity is thus removed from step to step, from one antenna to the following one, starting from the reference antenna l=1.

There is thus available a set of L estimated values $\hat{\xi}_l$ for $l=\{1, \ldots L\}$ from which the estimated values $\hat{v}$ and $\hat{\phi}$ are then obtained by linear regression. More precisely, the values $\hat{v}$ and $\hat{\phi}$ are sought which minimise the standard deviation J:

$$J(v, \varphi) = \sum_{l=1}^{L} (v + (l-1) \cdot \varphi - \hat{\xi}_l)^2 \quad (17)$$

These two values are obtained by cancelling out the partial derivatives of the function J:

$$\frac{\partial J}{\partial v}(\hat{v}, \hat{\varphi}) = 2 \cdot \sum_{l=1}^{L} \left(\hat{v} + (l-1) \cdot \hat{\varphi} - \hat{\xi}_l \right) = 0 \Leftrightarrow \hat{v} = \overline{\xi} - \hat{\varphi} \cdot \overline{l-1} \quad (18)$$

$$\text{with } \overline{\xi} = \frac{1}{L} \sum_{l=1}^{L} \hat{\xi}_l \text{ and } \overline{l-1} = \frac{1}{L} \sum_{l=1}^{L} (l-1)$$

$$\frac{\partial J}{\partial \varphi}(\hat{v}, \hat{\varphi}) = 2 \cdot \sum_{l=1}^{L} (l-1) \cdot \left(\hat{v} + (l-1) \cdot \hat{\varphi} - \hat{\xi}_l \right) = \quad (19)$$

$$0 \Leftrightarrow \overline{(l-1)^2} \cdot \hat{\varphi} = \overline{(l-1) \cdot \xi} - \hat{v} \cdot \overline{l-1}$$

$$\text{with } \overline{(l-1) \cdot \xi} = \frac{1}{L} \sum_{l=1}^{L} (l-1) \cdot \hat{\xi}_l \text{ and } \overline{(l-1)^2} = \frac{1}{L} \sum_{l=1}^{L} (l-1)^2$$

By replacing equation (18) in equation (19), there is obtained:

$$\overline{(l-1)^2} \cdot \hat{\varphi} = \quad (20)$$

$$\overline{(l-1) \cdot \xi} - (\overline{\xi} - \hat{\varphi} \cdot \overline{l-1}) \cdot \overline{l-1} \Leftrightarrow \hat{\varphi} = \frac{\overline{(l-1) \cdot \xi} - \overline{\xi} \cdot \overline{l-1}}{\overline{(l-1)^2} - \overline{(l-1)}^2}$$

By means of equation (18), it is then possible to calculate $\hat{v}$. From the value of $\hat{\varphi}$, it is also possible to deduce $\hat{\theta}$:

$$\hat{\theta} = \arccos\left(\frac{\hat{\varphi}}{2\pi d/\lambda}\right) \in [0; \pi] \quad (21)$$

At the end of the second step estimated values $\hat{v}$ and $\hat{\theta}$ are available. In the third step it is sought to evaluate the attenuation coefficient $\alpha$. To do this, first of all a new estimation $\tilde{\xi}_l$ is carried out of the phase differences at each antenna l using $\hat{v}$ and $\hat{\varphi}$, that is to say:

$$\tilde{\xi}_l = \hat{v} + (l-1) \cdot \hat{\varphi} \quad (22)$$

Finally, the estimated value $\hat{\alpha}$ of the attenuation $\alpha$ of the channel is that which minimises D, knowing that $\xi_l = \tilde{\xi}_l$, $\forall l$. According to equation (4), the value $\hat{\alpha}$, which cancels out the derivative $$\frac{\partial D}{\partial \alpha},$$

satisfies:

$$\frac{\partial D}{\partial \alpha}(\hat{\alpha}) = 2 \cdot \sum_{l=1}^{L} \sum_{t=1}^{T} \left[\hat{\alpha} \cdot |b(t)|^2 - \text{Re}(x_l(t) \cdot e^{-j\tilde{\xi}_l t} \cdot b^*(t))\right] = \quad (23)$$

-continued $$0 \Leftrightarrow \hat{\alpha} = \frac{\sum_{l=1}^{L} \sum_{t=1}^{T} \text{Re}(x_l(t) \cdot e^{-j\tilde{\xi}_l t} \cdot b^*(t))}{L \sum_{t=1}^{T} |b(t)|^2}$$

The estimation of θ, ν and α can be carried out dynamically using a sliding analysis window. Pursuing the angle of arrival then enables the beam former to continuously follow the mobile. Likewise, pursuit of the parameters ν and α makes it possible to ensure an adaptive combination of the different branches in a rake receiver.

Up to now a single path of the transmission channel has been considered. If the channel has several paths i=1 . . . p, the conjoint estimation method must be applied to each path i. The channel can then be characterised by a set of triplets of estimated values ($\hat{\theta}_i$, $\hat{v}_i$, $\hat{\alpha}_i$), i=1 . . . p, each triplet itself characterising a path.

Figure 3:
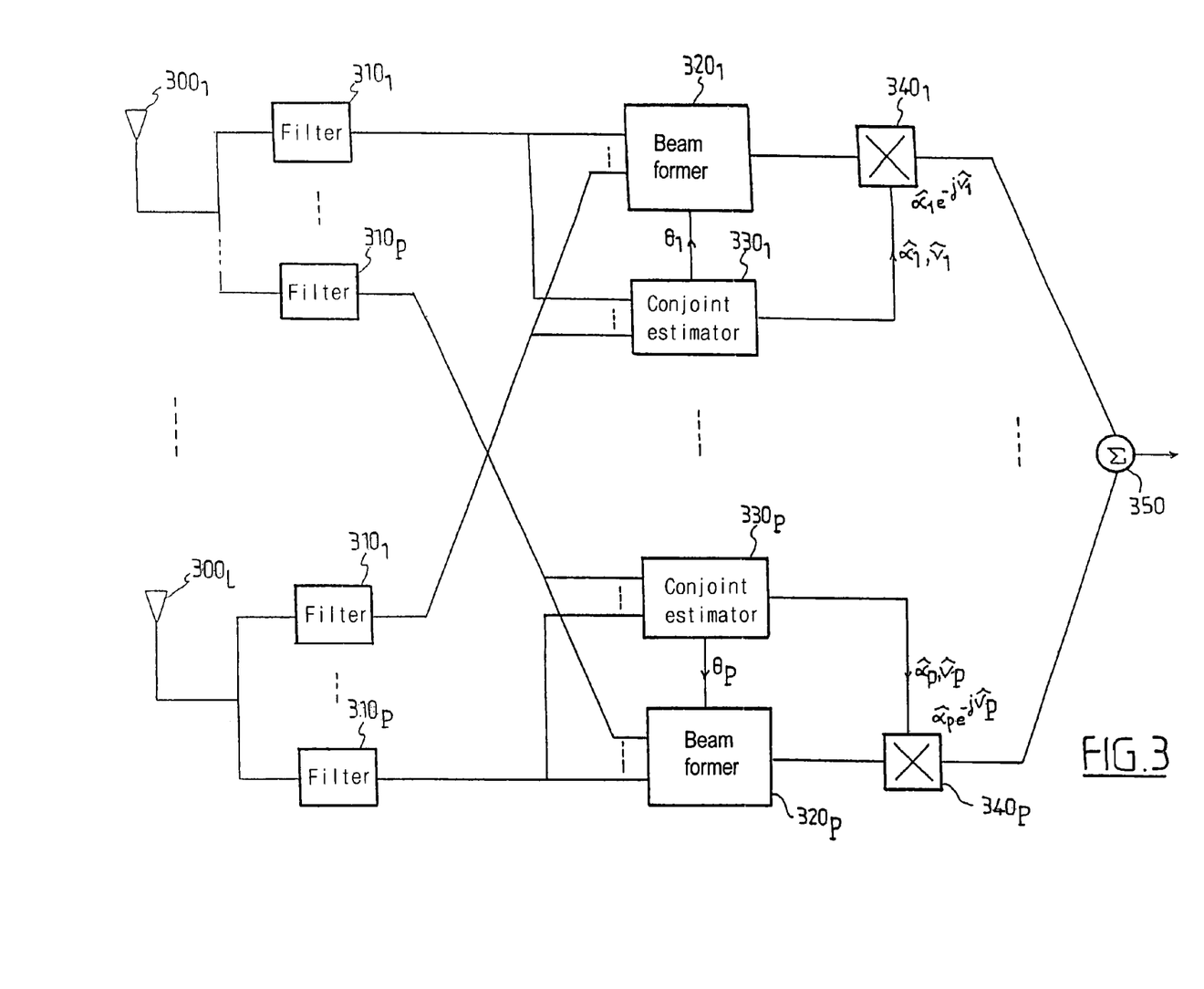
FIG. 3 depicts a reception device according to one embodiment of the invention.

FIG. 3 illustrates a reception device according to one embodiment of the invention. The device comprises an array of antennae (300.sub.1) . . . (300.sub.L). Each antenna (3001) is connected to a battery of suitable filters (310.sub.i), i=1 . . . p, each filter (310.sub.1) being adapted to a path i. The outputs of the different filters (310.sub.i) relating to the same path i are connected to a conjoint estimation module (330.sub.i) implementing the estimation method described above and supplying a triplet of estimated values ({circumflex over (.theta.)}.sub.i, {circumflex over (.nu.)}.sub.i, {circumflex over (.alpha.)}.sub.i). The estimation is effected in parallel for all the paths. The output signals relating to the same path i=1 . . . P are also directed to beam formation means (320.sub.1, . . . , 320.sub.p). The estimated value {circumflex over (.theta.)}.sub.i supplied by the conjoint estimation module to the beam former (320.sub.i) enables the latter to point its reception beam in the direction of arrival of the path i. In a variant embodiment which is not shown, each beam former (320.sub.i) also receives the estimated values {circumflex over (.theta.)}.sub.i' supplied by the other estimators (330.sub.i'), i'.noteq.i, of the paths i' of the same user. This enables the beam former (320.sub.i) to place zeros in the reception diagram for the directions concerned ({circumflex over (.theta.)}.sub.i', i'.noteq.i) so as best to separate the signals received from different paths. The estimated values {circumflex over (.nu.)}.sub.i and {circumflex over (.alpha.)}.sub.i are transmitted to a complex multiplier (340.sub.i), which multiplies the output signal of the beam former (320.sub.i) by the complex coefficient {circumflex over (.alpha.)}i..sub.e.sup.-j {circum- flex over (.nu.)}i, the conjugate of the complex coefficient of the channel. The outputs of the P multipliers are then summed in a summer (350) in order to supply an output of the MRC (Maximum Ratio Combining) type.

This reception device makes it possible to effect both a formation of channels in the directions of the different paths and a combination of the MRC type as in a rake filter. It is clear to a person skilled in the art that the operations represented by the different modules in FIG. 3 can be effected by a processor programmed for this purpose or by a plurality of dedicated processors.

Although the invention has been essentially described in the context of the reception of a signal transmitted by a mobile terminal and received by the adaptive antenna of a base station, it is clear to a person skilled in the art that the invention is not limited to this example application but extends to any type of application requiring the estimation of the direction of arrival of a useful signal and the characteristics of a transmission channel.

The invention claimed is:

1. A method of estimating a channel and a direction of arrival (θ) of a signal received by an array of antennae after being propagated along at least one path, comprising, for each path:
   a first step of estimating for each antenna (l) in the array of antennae a total phase difference ($\xi_l$) from a signal ($x_l$) received by each antenna (l);
   a second step of estimating the angle of arrival (θ) of the signal, as well as a phase rotation (v) undergone by the signal along the at least one path, using each of the antennae total phase differences determined in the first step;
   a third step of estimating an attenuation (α) undergone by the signal along the at least one path from estimated values ($\hat{v}, \hat{\theta}$) of the phase rotation (v) and the angle of arrival (θ); and
   a fourth step of forming a beam using said array pointed in a direction based upon said angle of arrival,
   wherein the first step comprises, for each signal received ($x_l$), minimizing a distance between a plurality of values of the received signal ($x_l$) taken at a plurality of times (t) and values of a pilot signal (b) taken at said plurality of times (t).

2. The estimation method according to claim 1, wherein the first step comprises estimating the total phase difference $\xi_l$, of the signal $x_l$ received by the antenna l by the following equations: where $$\hat{\xi}_l = \text{Arc tan}\left(\frac{S_l^1 - S_l^2}{S_l^3 + S_l^4}\right) \text{ where}$$

$$S_l^1 \triangleq \sum_{t=1}^{T} x_l^I(t) \cdot b_R(t)$$

$$S_l^2 \triangleq \sum_{t=1}^{T} x_l^R(t) \cdot b_I(t)$$

$$S_l^3 \triangleq \sum_{t=1}^{T} x_l^R(t) \cdot b_R(t)$$

$$S_l^4 \triangleq \sum_{t=1}^{T} x_l^I(t) \cdot b_I(t)$$

where $x_l^r$ (t) and $x_l^I$ (t) are respectively a real part and an imaginary part of a value of the signal $x_l$, received in antennae l at t, $b_R(t)$ and $b_I(t)$ are real and imaginary parts of a value of the pilot signal b at the time t, and T is a time window length.

3. A method of estimating a channel and a direction of arrival (θ) of a signal received by an array of antennae after being propagated along at least one path, comprising, for each path:
   a first step of estimating for each antenna (l) in the array of antennae a total phase difference ($\xi_l$) from a signal ($x_l$) received by each antenna (l);
   a second step of estimating the angle of arrival (θ) of the signal, as well as a phase rotation (v) undergone by the signal along the at least one path, using each of the antennae total phase differences determined in the first step;
   a third step of estimating an attenuation (α) undergone by the signal along the at least one path from estimated values ($\hat{v}, \hat{\theta}$) of the phase rotation (v) and the angle of arrival (θ); and
   a fourth step of forming a beam using said array pointed in a direction based upon said angle of arrival,
   wherein the second step comprises removing an ambiguity in the total phase difference values sequentially from one antenna to another antenna starting from a reference antenna of the array.

4. The estimation method according to claim 3, wherein the step of removing of an ambiguity comprises using an affine relationship between the total phase difference and a rank of a respective antenna in the array.

5. A method of estimating a channel and a direction of arrival (θ) of a signal received by an array of antennae after being propagated along at least one path, comprising, for each path:
   a first step of estimating for each antenna (l) in the array of antennae a total phase difference ($\xi_l$) from a signal ($x_l$) received by each antenna (l);
   a second step of estimating the angle of arrival (θ) of the signal, as well as a phase rotation (v) undergone by the signal along the at least one path, using each of the antennae total phase differences determined in the first step;
   a third step of estimating an attenuation (α) undergone by the signal along the at least one path from estimated values ($\hat{v}, \hat{\theta}$) of the phase rotation (v) and the angle of arrival (θ) and
   a fourth step of forming a beam using said array pointed in a direction based upon said angle of arrival,
   wherein the second step comprises estimating the phase rotation (v) and the angle of arrival (θ) from a linear regression of estimated values of the total phase differences.

6. The estimation method according to claim 5, wherein said second step comprises estimating the phase rotation (v) and the angle of arrival (θ) by minimizing a distance $$J(v, \varphi) = \sum_{l=1}^{L} \left(v + (l-1) \cdot \varphi - \hat{\xi}_l\right)^2$$

where $\hat{\xi}_l$ is an estimated value of the total phase difference of the signal received by the antenna of rank l, and $\varphi = 2\pi \cdot \cos(\theta) \cdot d/\lambda$ where d is a pitch of the array, λ is a wavelength of the signal, and L is a number of antennae in the array.

7. A method of estimating a channel and a direction of arrival (θ) of a signal received by an array of antennae after being propagated along at least one path, comprising, for each path: a first step of estimating for each antenna (l) in the array of antennae a total phase difference ($\xi_l$) from a signal ($x_l$) received by each antenna (l);
   a second step of estimating the angle of arrival (θ) of the signal, as well as a phase rotation (v) undergone by the signal along the at least one path, using each of the antennae total phase differences determined in the first step;
   a third step of estimating a new value ($\tilde{\xi}_l$) of the total phase difference for each antenna l in the array, by using the estimated values of the phase rotation ($\hat{v}$) and the angle arrival ($\hat{\theta}$);

a fourth step of estimating an attenuation ($\alpha$) undergone by the signal along the at least one path from estimated values ($\hat{v}$, $\hat{\theta}$) of the phase rotation ($v$) and the angle of arrival ($\theta$); and a fifth step of forming a beam using said array pointed in a direction based upon said angle of arrival.

8. The estimation method according to claim 7, wherein the fourth step comprises minimizing a distance between a plurality of values of the signal ($x_l$) taken at a plurality of times (t) and values of a phase-shifted pilot signal (b) taken at said plurality of times (t).

9. A signal reception device comprising an array of antennae and a corresponding plurality of estimation means each of said plurality of estimation means, each of said plurality of estimation means comprising:

means for estimating for each antenna (l) in the array of antennae a total phase difference ($\xi_l$) from a signal ($x_l$) received by each antenna (l);

means for estimating the angle of arrival ($\theta$) of the signal, as well as a phase rotation ($v$) undergone by the signal along the at least one path, using each of the antennae total phase differences determined in the first step;

means for estimating an attenuation ($\alpha$) undergone by the signal along the at least one path from estimated values ($\hat{v}$, $\hat{\theta}$) of the phase rotation ($v$) and the angle of arrival ($\theta$), and at the output of each antenna, a plurality of filters, each adapted to different signal propagation paths; wherein each of said plurality of estimation means is associated with a path (i) and is configured to receive an output of a corresponding filter.

10. The signal reception device according to claim 9, comprising:

a plurality of beam formation means, each beam formation means being associated with a path (i) and configured to receive from a corresponding estimation means associated with the said path, an estimate $\hat{\theta}_i$ of an angle of arrival of the said path.

11. The signal reception device according to claim 10, wherein each beam formation means is also configured to receive from an estimation means other than the corresponding estimation means an estimate ($\hat{\theta}_{i'}$, i'≠i) of an angle of arrival of another path.

12. The signal reception device according to claim 10, comprising a plurality of complex multiplication means, each complex multiplication means being associated with a path (i) and configured to multiply an output of a corresponding beam formation means by a complex coefficient $\hat{\alpha}_i e^{-j\hat{v}_i}$, where $\hat{v}_i$ and $\hat{\alpha}_i$ are estimated values of a phase rotation and of an attenuation coefficient, respectively, supplied by the corresponding estimation means.

13. A signal reception device comprising an array of antennae and a corresponding plurality of estimators each of said plurality of estimators comprising:

an estimator configured to estimate for each antenna (l) in the array of antennae a total phase difference ($\xi_l$) from a signal ($x_l$) received by each antenna (l)

an estimator configured to estimate the angle of arrival ($\theta$) of the signal, as well as a phase rotation ($v$) undergone by the signal along the at least one path, using each of the antennae total phase differences determined in the first step;

means for estimating an attenuation ($\alpha$) undergone by the signal along the at least one path from estimated values ($\hat{v}$, $\hat{\theta}$) of the phase rotation ($v$) and the angle of arrival ($\theta$); and at the output of each antenna, a plurality of filters, each adapted to different signal propagation paths, wherein each of said plurality of estimators is associated with a path (i) and is configured to receive an output of a corresponding filter.

14. The signal reception device according to claim 13, comprising:

a plurality of beam formers, each beam former being associated with a path (i) and configured to receive from a corresponding estimator associated with the said path, an estimate $\hat{\theta}_i$ of an angle of arrival of the said path.

15. The signal reception device according to claim 14, wherein each beam former is also configured to receive from an estimator other than the corresponding estimator an estimate ($\hat{\theta}_{i'}$, i'≠i) of an angle of arrival of another path.

16. The signal reception device according to claim 14, comprising a plurality of complex multipliers, each complex multiplier being associated with a path (i) and configured to multiply an output of a corresponding beam former by a complex coefficient $\hat{\alpha}_i e^{-j\hat{v}_i}$, where $\hat{\xi}_i$ and $\hat{\alpha}_i$ are estimated values of a phase rotation and of an attenuation coefficient, respectively, supplied by the corresponding estimator.

* * * * *